US011062703B2

(12) United States Patent
Bauer et al.

(10) Patent No.: US 11,062,703 B2
(45) Date of Patent: Jul. 13, 2021

(54) AUTOMATIC SPEECH RECOGNITION WITH FILLER MODEL PROCESSING

(71) Applicant: Intel Corporation, Santa Clara, CA (US)

(72) Inventors: Josef Bauer, Santa Clara, CA (US); Tobias Bocklet, Santa Clara, CA (US); Joachim Hofer, Santa Clara, CA (US); Munir Georges, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 16/106,852

(22) Filed: Aug. 21, 2018

(65) Prior Publication Data

US 2019/0043503 A1 Feb. 7, 2019

(51) Int. Cl.
*G10L 15/22* (2006.01)
*G10L 15/02* (2006.01)
*G10L 25/54* (2013.01)
*G10L 17/04* (2013.01)

(52) U.S. Cl.
CPC .............. *G10L 15/22* (2013.01); *G10L 15/02* (2013.01); *G10L 25/54* (2013.01); *G10L 17/04* (2013.01); *G10L 2015/025* (2013.01); *G10L 2015/223* (2013.01); *G10L 2015/225* (2013.01)

(58) Field of Classification Search
CPC combination set(s) only.
See application file for complete search history.

(56) References Cited

U.S. PATENT DOCUMENTS

| | | | |
|---|---|---|---|
| 9,548,053 B1 * | 1/2017 | Basye | G06F 16/683 |
| 10,332,513 B1 * | 6/2019 | D'Souza | G10L 15/183 |
| 10,366,692 B1 * | 7/2019 | Adams | H04M 3/5166 |
| 10,453,460 B1 * | 10/2019 | Wightman | G06F 16/316 |
| 10,482,879 B2 * | 11/2019 | Tang | G10L 15/02 |
| 10,586,534 B1 * | 3/2020 | Argyropoulos | G10L 15/22 |
| 10,623,246 B1 * | 4/2020 | Iyer | G10L 15/22 |
| 10,649,727 B1 * | 5/2020 | Douglas | G10L 15/22 |
| 2014/0039888 A1 * | 2/2014 | Taubman | H04M 1/72457 704/235 |
| 2015/0058018 A1 * | 2/2015 | Georges | G10L 15/08 704/257 |
| 2016/0133259 A1 * | 5/2016 | Rubin | G10L 15/22 704/238 |
| 2016/0267913 A1 * | 9/2016 | Kim | G10L 15/30 |
| 2016/0284350 A1 * | 9/2016 | Yun | G06F 3/167 |

(Continued)

*Primary Examiner* — Abdelali Serrou
(74) *Attorney, Agent, or Firm* — Hanley, Flight and Zimmerman, LLC

(57) ABSTRACT

An automatic speech recognition (ASR) system includes a memory configured to store a filler model. The filler model includes one or more phonetic strings corresponding to one or more portions of a wake up phrase. The ASR system also includes one or more processors operatively coupled to the memory and configured to analyze a speech signal with the filler model to determine whether the speech signal includes the wake up phrase or any portion of the wake up phrase. The one or more processors are also configured to generate, based on the analysis, a hypothesis of underlying speech included in the speech signal. The hypothesis excludes the wake up phrase or any portion of the wake up phrase included in the speech signal.

8 Claims, 7 Drawing Sheets

(56) References Cited

U.S. PATENT DOCUMENTS

| | | | |
|---|---|---|---|
| 2016/0379632 A1* | 12/2016 | Hoffmeister | G10L 15/18 704/253 |
| 2017/0025124 A1* | 1/2017 | Mixter | G10L 15/32 |
| 2017/0148444 A1* | 5/2017 | Bocklet | G10L 15/142 |
| 2018/0158449 A1* | 6/2018 | Tang | G10L 13/04 |
| 2018/0204569 A1* | 7/2018 | Nadkar | G10L 15/22 |
| 2018/0234765 A1* | 8/2018 | Torok | G06F 3/165 |
| 2018/0336886 A1* | 11/2018 | Sun | G10L 15/16 |
| 2019/0295541 A1* | 9/2019 | Pelton | G10L 15/22 |
| 2019/0355384 A1* | 11/2019 | Sereshki | G10L 15/08 |
| 2019/0371310 A1* | 12/2019 | Fox | G10L 15/08 |
| 2019/0378499 A1* | 12/2019 | Miller | G06F 3/167 |
| 2019/0378500 A1* | 12/2019 | Miller | G06F 3/167 |

* cited by examiner

AUTOMATIC SPEECH RECOGNITION WITH FILLER MODEL PROCESSING

BACKGROUND

Automatic speech recognition (ASR) refers to the use of computer hardware and/or software to recognize and translate human speech. Automatic speech recognition systems can be used to perform biometric authentication of an individual based on his/her voice, as part of a user interface in which users speak commands that are interpreted and implemented by the system, to perform data entry or document creation, to enable hands-free usage of a device in a vehicle or other environment, etc.

BRIEF DESCRIPTION OF THE DRAWINGS

Illustrative embodiments of the invention will hereafter be described with reference to the accompanying drawings, wherein like numerals denote like elements.

DETAILED DESCRIPTION

Automatic speech recognition (ASR) refers to the use of computer hardware and/or software to recognize and translate human speech such as user commands and user requests. Many traditional ASR systems operate in a perpetual standby mode such that they are always instantly available to the user. In such ASR systems, the ASR hardware/software is continually listening to its surroundings so that it is always ready to execute user requests. However, a typical environment will include a myriad of sounds and voices originating from television sets, radios, human conversations, pets, children, etc. Processing all of these voices and sounds in an effort to identify user commands results in high power consumption and is inefficient because a majority of the speech/sounds in a typical environment are not intended for the ASR system.

To improve efficiency and reduce power consumption, many traditional ASR systems include a standby processing system that is designed to listen for a specific wake up phrase (or guard phrase, voice trigger, trigger phrase, etc.) and to ignore other voices and sounds. The wake up phrase is one or more words such as 'hello,' 'hello computer,' etc. that are uttered by the user prior to giving a command or request to the ASR system. Upon recognition of the wake up phrase, the ASR system becomes fully functional, listens for a command, receives and translates the command, and executes the command. Once the command is executed and/or after a predetermined amount of time has passed after utterance of the wake up phrase, the ASR system again goes into standby mode and the standby processing system listens for another utterance of the wake up phrase.

Figure 1:
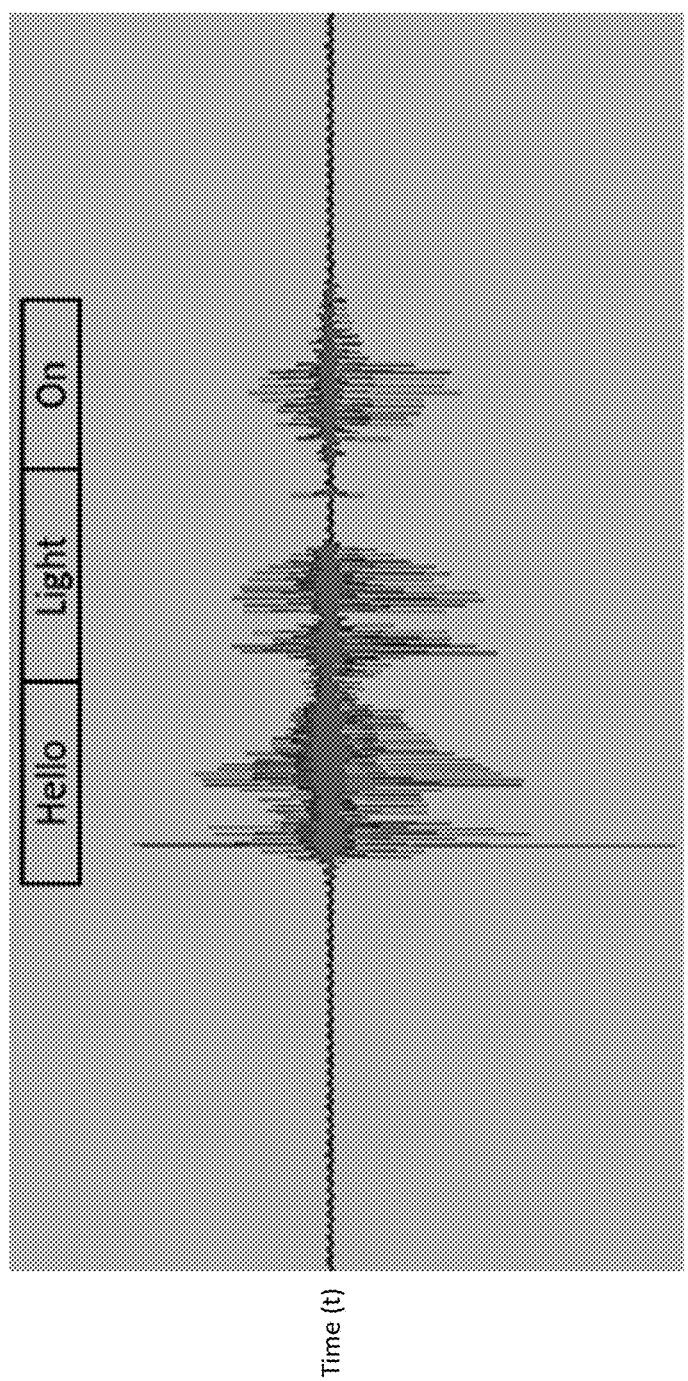
FIG. 1 depicts a speech signal in which a user utters the phrase 'Hello Light On' without a pause in accordance with an illustrative embodiment.

A problem can occur in ASR systems due to co-articulation when the user utters the wake up phrase followed immediately by a command. For example, FIG. 1 depicts a speech signal in which a user utters the phrase 'Hello Light On' without a pause. In the speech signal, 'Hello' is the wake up phrase and 'Light On' is the command. Due to the lack of a pause in the utterance, it can be seen that the speech signal is continuous at the junction between the words 'Hello' and 'Light.' In such a scenario, the ASR system may be unable to distinguish between the wake up phrase and the command, which can result in a portion of the wake up phrase being submitted to a main ASR processing system as part of the command. As a result, the main ASR processing system may not understand the command or may misinterpret the command, resulting in a failure to execute the command or execution of the wrong command.

One possible solution for handling situations in which the wake up phrase and command are uttered in succession without a pause is for the standby processing system to utilize a phrase segmentation approach in which the standby processing system attempts to identify when the wake up phrase ends, cuts off the wake up phrase, and transmits only the command portion of the utterance to the main ASR processing system. However, such a phrase segmentation approach can be difficult to implement with accuracy in scenarios where there is no pause between the wake up phrase and the command. Specifically, in attempting to identify the exact time of transition between utterance of the wake up phrase and utterance of the command, there is a significant risk that a portion of the wake up phrase is passed to the main ASR processing system along with the command or that a portion of the command is cut off and not passed to the main ASR processing system. Either of these results reduces the likelihood that the command will be properly interpreted, which decreases the overall accuracy of the ASR system.

Another possible solution for handling situations in which the wake up phrase and command are uttered in immediate succession is to design the standby processing system of the ASR system to pass the entire wake up phrase and command to the main ASR processing system, along with an initial buffer (e.g., 100 milliseconds (ms), 200 ms, etc.) to ensure that the entire wake up phrase is included. In such an implementation, the main ASR processing system can be configured to look for, identify, and disregard the wake up phrase prior to processing and executing the command. However, such an implementation involves significant memory and power requirements, and may not be feasible in ASR systems with buffer or memory limitations or in systems in which the standby processing system runs on an ultra-low power device. For example, in real world applications, such an implementation would require a buffer of 1, 2, or more seconds, which utilizes 16-32+ kilobytes of memory for a 16 kilohertz, 16 bit speech signal. Additionally, such an implementation introduces a time delay due to processing of a more lengthy speech signal at the main ASR processing system, which is conducted after processing of the wake up phrase has occurred.

Described herein are methods, systems, and computer-readable media for improving command accuracy and overall efficiency of ASR systems that utilize a wake up phrase. Specifically, a filler model incorporated into a front end of the main ASR processing system and is used to identify any portion of the wake up phrase that is passed on from the standby ASR processing system. The filler model is derived from a phoneme string of the wake up phrase. More specifically, the filler model includes sub-words (or pseudo-words) made of phonemes and corresponding to the different portions of the wake up phrase that could potentially be passed along from the standby ASR processing system. Use of the filler model avoids a sharp cut between the wake up phrase and the command, and helps ensure that the command is not damaged before being processed by the main ASR processing system because any co-articulations remain intact. Use of the filler model also allows the main ASR processing system to be properly initiated such that all acoustic filters and recurrent neuronal networks are settled.

As an example, a phoneme string for the wake up phrase 'HELLO' can be /HH AHO L OW1/. A resulting filler model corresponding to the wake up phrase 'HELLO' includes 4 sub-words having the following derived phoneme strings: /HH AHO L OW1/, /AHO L OW1/, /L OW1/, and /OW1/. Upon receipt of an utterance that is passed on from the standby ASR processing system, the main ASR processing system uses the filler model in addition to the standard language model to process the utterance and generate a hypothesis of the underlying speech in the utterance. The standard language model refers to a probability distribution over sequences of words, and is used to assign a probability that an utterance corresponds to a given sequence of words. The filler model increases a likelihood that a wake up phrase or a portion of the wake up phrase in the utterance will be identified and taken into consideration when forming the hypothesis of the underlying speech. If the main ASR processing system determines that the received utterance begins with any of the phoneme strings in the wake up phrase, that phoneme string is ignored during hypothesis formation such that the hypothesis of the underlying speech includes only a command portion of the utterance. This system and process are described in detail below with reference to the figures.

Figure 2:
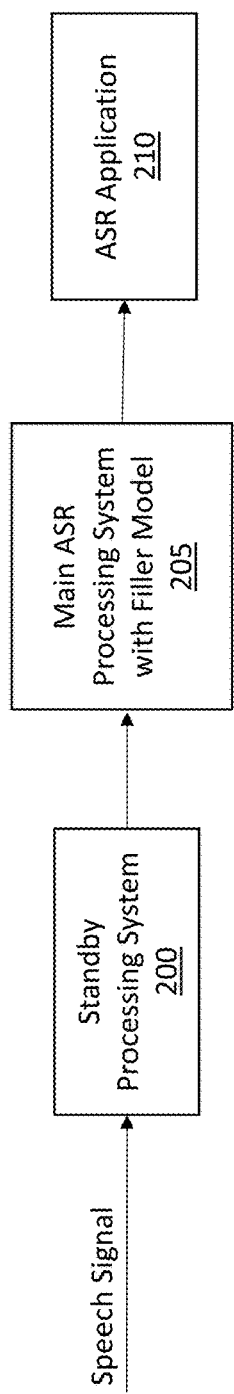
FIG. 2 is a block diagram depicting high level components of an automatic speech recognition system in accordance with an illustrative embodiment.

FIG. 2 is a block diagram depicting high level components of an automatic speech recognition system in accordance with an illustrative embodiment. The ASR system includes a standby processing system 200, a main ASR processing system with a filler model 205 (or main ASR processing system 205), and an ASR application 210. In alternative embodiments, the ASR system may include fewer, additional, and /or different components. The standby processing system 200 includes an audio capture device and is designed to continually listen for a speech signal that includes a wake up phrase. Upon detection of the wake up phrase by the standby processing system 200, a speech signal is passed to the main ASR processing system with the filler model 205. The speech signal includes a command, and may also include all or a portion of the wake up phrase.

The main ASR processing system 205 processes the received speech signal to generate a hypothesis regarding the underlying speech that is included in the speech signal. Specifically, in addition to a standard language model, the main ASR processing system 205 also uses a filler model to form the hypothesis. In the embodiments described herein, the filler model includes phoneme strings which represent a phonetic representation of the entire wake up phrase and phonetic representations of portions of the wake up phrase that are potentially included in the speech signal. In alternative embodiments, the filler model may be used to identify/distinguish other phrases such as commonly confused commands, commands or other utterances that are made in rapid succession, etc. This filler model is used during hypothesis formation to determine whether the wake up phrase (or a portion thereof) is present in the received speech signal. If the wake up phrase (or a portion thereof) is determined to be present in the speech signal, it is excluded from the hypothesis of the underlying speech that is generated by the system. As a result, there is a higher likelihood that the hypothesis includes only a command portion of the received speech signal.

The hypothesis of the underlying speech in the speech signal is then further processed by the main ASR processing system 205 to identify the actual command associated with the speech, and to cause execution of the command by the ASR application 210. The ASR application 210 includes hardware and /or software that is configured to execute or cause execution of the command received from the user. The components of FIG. 2 and their functions are described in more detail below with reference to FIG. 3.

Figure 3:
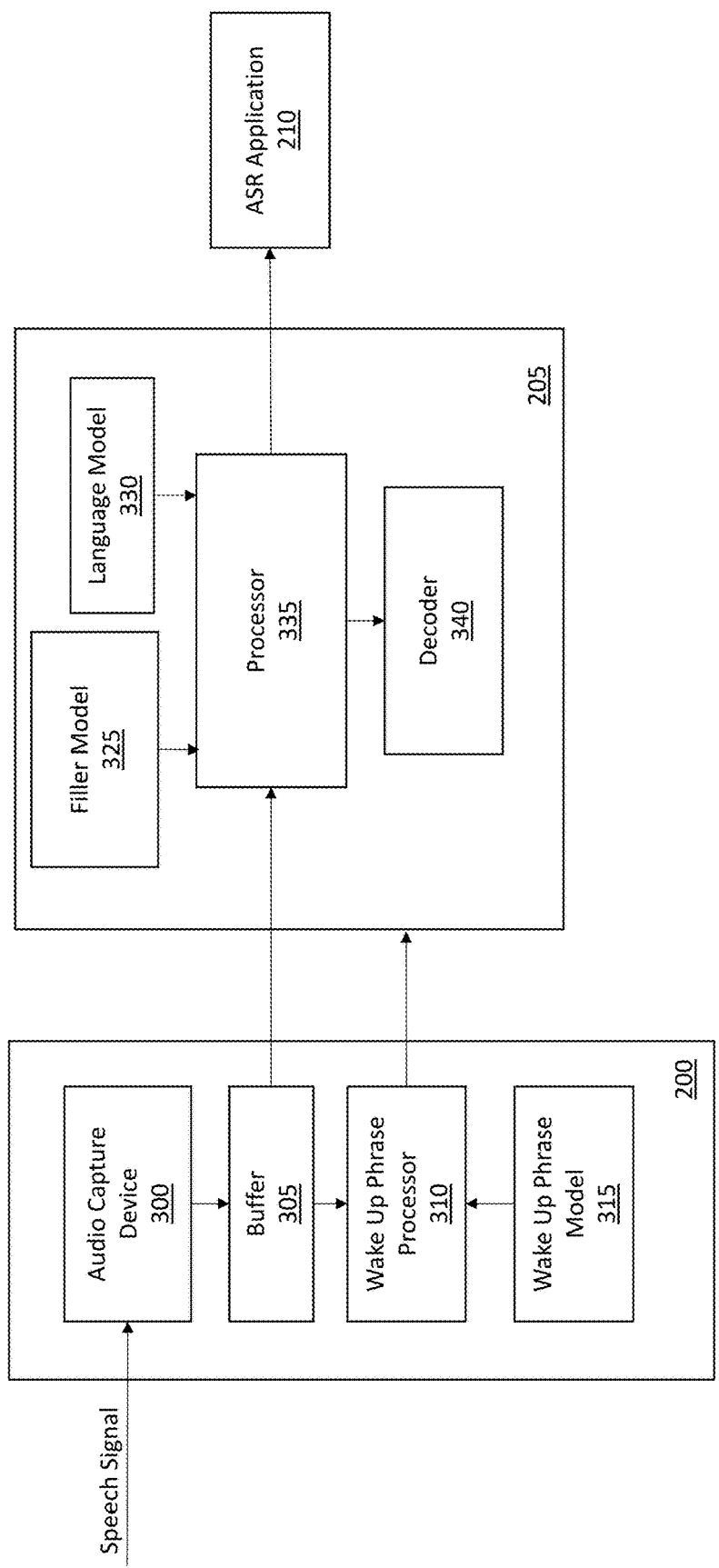
FIG. 3 is a detailed block diagram of the automatic speech recognition system of FIG. 2 in accordance with an illustrative embodiment.

FIG. 3 is a detailed block diagram of the automatic speech recognition system of FIG. 2 in accordance with an illustrative embodiment. The standby processing system 200 includes an audio capture device 300, a buffer 305, a wake up phrase processor 310, and a wake up phrase model 315. In alternative embodiments, the standby processing system 200 can include fewer, additional, and /or different components. The audio capture device 300 includes one or more microphones and is used to capture a speech signal. The buffer 305 is used to temporarily store the captured speech signal. The buffer 305 can be any type of buffer or computer memory known the art. For example, the buffer 305 can be a circular buffer or a ring buffer in which previously stored speech signals are overwritten by newly captured speech signals.

The wake up phrase processor 310 includes a processing component such as a computer processor, a microprocessor, or a microcontroller that analyzes the captured speech signal that is stored in the buffer 305. The wake up phrase processor 310 can also include software in the form of computer-readable instructions that are executed by the processing component. The software is stored on a computer-readable medium such as a computer memory. The hardware and /or software of the wake up phrase processor 310 is used to identify phonemes in the captured speech signal, and to compare the identified phonemes to the known phonemes of the wake up phrase, which are included in the wake up phrase model 315. The wake up phrase model 315 refers to a data set that includes a phonetic version of the wake up phrase. The wake up phrase model 315 can be stored on a computer memory that is accessible to the wake up phrase processor 310. In alternative implementations, any other method known in the art for identifying the wake up phrase may be used.

If the wake up phrase processor 310 determines that the captured speech signal includes the wake up phrase, the wake up phrase processor 310 triggers activation of the main ASR processing system 205. Triggering activation refers to transmission of an instruction which causes the main ASR processing system 205 to transition from a sleep (or other low power consumption) state to an active state, which is a higher power consuming state. In an alternative implementation, the main ASR processing system 205 is in a perpetual active state. In such an implementation, the wake up phrase processor 310 does not trigger activation of that system.

If the wake up phrase processor 310 determines that the captured speech signal includes the wake up phrase, the wake up phrase processor 310 also causes at least a portion of the captured speech signal to be passed from the buffer 305 to the main ASR processing system 205. Passing the entire captured speech signal involves transmission of a large amount of data, and is resource intensive on the low power standby processing system 200. Additionally, as discussed above, passing the entire captured speech signal results in a processing delay due to transmission of the data and the processing of a more lengthy speech signal. As also discussed above, precisely cutting off the wake up phrase and passing only the command portion of the captured speech signal is oftentimes not possible due to the above-described effects of co-articulation.

It is thus desirable for the wake up phrase processor 310 to pass all or a portion of the captured speech signal stored in the buffer 305 to the main ASR processing system 205, where the passed speech signal includes as much of the original speech signal as possible to ensure that a beginning of the command is not cut off. Different systems have differing limitations with respect to buffer storage, processing power, transmit power, etc. For example, some systems may be able to pass the entire captured speech signal on to the main ASR processing system for further processing. In such systems, the speech signal passed on to the main ASR processing system includes the entire wake up phrase. Other systems may be able to pass only a portion of the captured speech signal to the main ASR processing system due to the aforementioned system limitations. In such systems, the speech signal passed on to the main ASR processing system can include all of the wake up phrase, a portion of the wake up phrase, or only the command without any portion of the wake up phrase.

The main ASR processing system 205 includes a filler model 325, a language model 330, a processor 335, and a decoder 340. As discussed, the language model 330 refers to a probability distribution over sequences of words, and is used to assign a probability that an utterance corresponds to a given sequence of words. Any type of language model known in the art may be used. In alternative embodiments, the main ASR processing system 205 may include fewer, additional, and /or different components. The processor 335 includes a processing component such as a computer processor, a microprocessor, or a microcontroller that analyzes the portion of the captured speech signal that is received from the buffer 305. The processor 335 can also include software in the form of computer-readable instructions that are executed by the processing component. The software is stored on a computer-readable medium such as a computer memory.

The hardware and /or software of the processor 335 is used in conjunction with the filler model 325 and the language model 330 to generate a hypothesis of the underlying speech in a speech signal. In an illustrative embodiment, the processor 335 performs acoustic modeling to assign probabilities to acoustic realizations of an utterance. The processor 335 also uses language modeling to assign probabilities to sequences of words in the language, and a hypothesis search to find the word sequence with the maximum a posteriori probability of corresponding to the utterance. Use of the filler model 325 enhances the acoustic modeling capability of the system and increases the likelihood that any portion of the wake up phrase which is included in the speech signal will be identified and excluded from the generated hypothesis of the underlying speech, thereby increasing system accuracy. Use of the filler model to improve hypothesis formation is described in more detail below.

In an illustrative embodiment, the main ASR processing system 205 analyzes the entire received speech signal using both the filler model 325 and the language model 330, each of which can be implemented as weighted finite-state transducers (WFSTs). As such, inclusion of a portion of the wake up phrase anywhere within the speech signal is identified and taken into consideration when forming the hypothesis of the underlying speech. In an alternative implementation, during hypothesis formation, the processor 335 identifies a predetermined number of the first phonemes included in the received portion of the captured speech signal and uses the filler model 325 to enhance phoneme matching and to determine whether these first phonemes correspond to any portion of the wake up phrase. For example, if the wake up phrase includes 4 phonemes, the processor 335 identifies the first 4 phonemes in the received portion of the captured speech signal. Alternatively, in such a scenario, the processor 335 can identify the first 5 phonemes, the first 6 phonemes, etc. to help ensure that, if present, all of the wake up phrase is identified.

In another implementation, during hypothesis formation, the processor 335 identifies phonemes in a predetermined initial time period of the received speech signal and uses the filler model 325 to help determine whether the identified phonemes correspond to any portion of the wake up phrase. The predetermined initial time period can be based on an expected amount of time that it takes for a user to utter the wake up phrase. For example, if the average user takes 800 ms to utter the wake up phrase, the predetermined initial time period can be 800 ms. Alternatively, the predetermined initial time period can be less than 800 ms (e.g., 500 ms, 600 ms, 700 ms, etc.) if the received speech signal is only a portion of the originally captured speech signal and it is likely that all or a portion of the wake up phrase has already been cut off.

In an illustrative embodiment, the filler model 325 is represented as a weighted finite state transducer (WFST). The WFST can be implemented as a dynamic vocabulary or statically, depending on the embodiment. The filler model 325 includes every possible ordered combination of phonetic strings that make up the wake up phrase. For example, as discussed above, if the wake up phrase is "HELLO," the filler model 325 includes 4 phoneme strings, 1 of which corresponds to the entire wake up phrase and 3 of which correspond to sub-words in the form of ordered phonemes that make up portions of the wake up phrase. For the word "HELLO," the 4 phoneme strings are /HH AHO L OW1/, /AHO L OW1/, /L OW1/, and /OW1/. In an illustrative embodiment, the filler model 325 is automatically derived by the ASR system as described in detail with reference to FIG. 6. In such an embodiment, the filler model 325 is automatically changed if the user changes the wake up phrase for the ASR system. In an alternative embodiment, the wake up phrase is static, and the filler model 325 is manually entered into the main ASR processing system 205. The filler model 325 can be stored on a computer memory that is accessible to the processor 335.

In one embodiment, the processor 335 compares the identified phonemes in a received speech signal to the phonetic strings in the filler model 325 which correspond to the whole and portions of the wake up phrase. If the comparison using the filler model 325 results in a determination that a portion of the wake up phrase is present in the speech signal, the wake up phrase (or portion thereof) is excluded from the hypothesis of the underlying speech included in the speech signal. This increases the likelihood that the hypothesis includes only a command portion of the underlying speech. In an illustrative embodiment, the system is also configured to account for a scenario in which the last phoneme of the wake up phrase is the same as the first phoneme of the command. For example, the utterance may be "HELLO ORDER PIZZA," in which case the /OW1/ phoneme is used consecutively at the end of the wake up phrase (i.e., "HELLO") and at the beginning of the command. If the first identified phoneme in the speech signal corresponding to the utterance is /OW1/, the system does not automatically assume that the /OW1/ corresponds to the wake up phrase. Rather, the system considers the speech signal as a whole and probabilistically determines whether the /OW1/ corresponds to a portion of the wake up phrase or to the start of the command.

Figure 4:
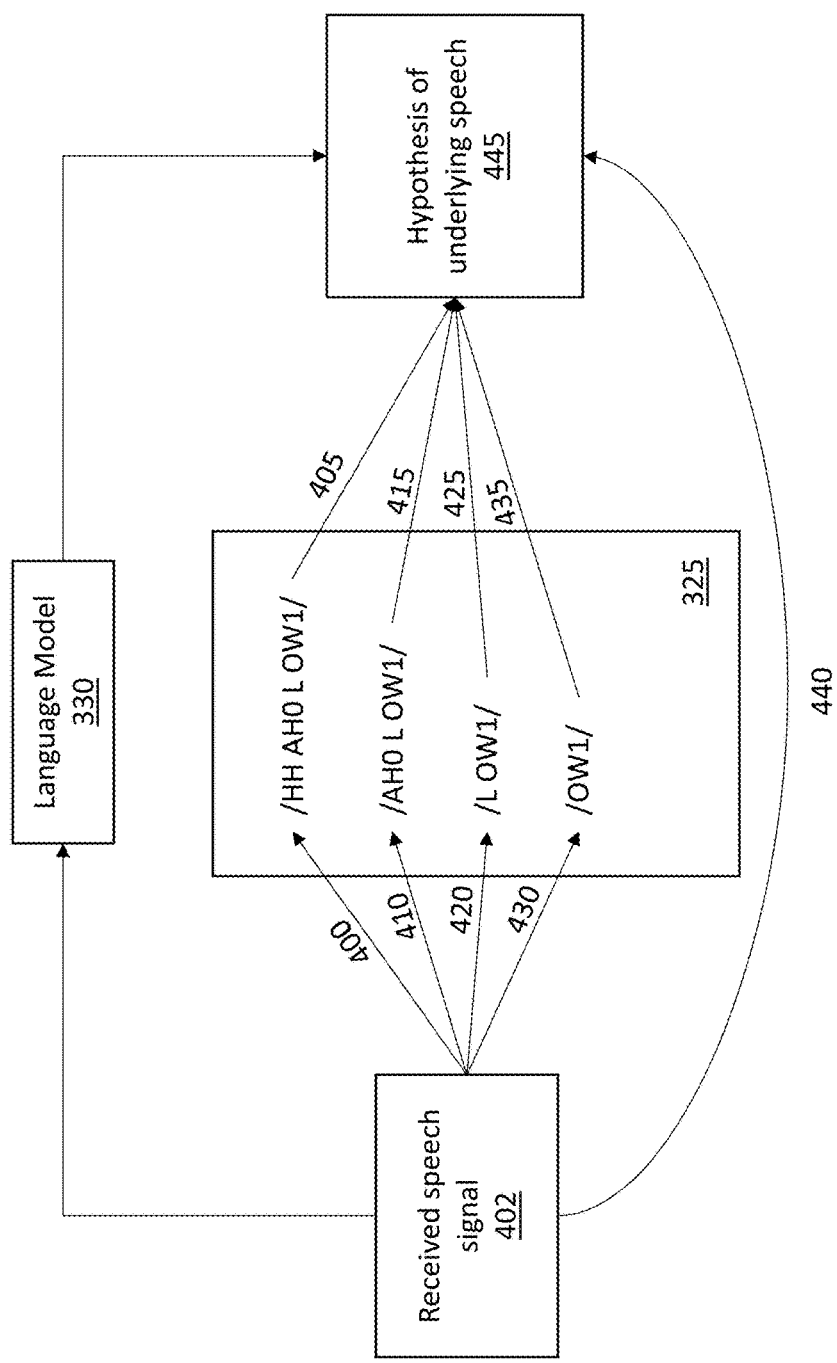
FIG. 4 is an arc diagram depicting use of a filler model during hypothesis formation by a main ASR processing system in accordance with an illustrative embodiment.

FIG. 4 is an arc diagram depicting use of a filler model during hypothesis formation by the main ASR processing system 205 in accordance with an illustrative embodiment. The filler model 325 includes phoneme strings corresponding to the wake up phrase HELLO. In alternative implementations, a different wake up phrase may be used. As discussed above, the processor 335 compares identified phonemes in a received speech signal 402 to the phonetic strings in the filler model 325 using WFST techniques as known in the art. An arc 400 represents comparison of the received speech signal 402 to the phonetic string /HH AHO L OW1/, which corresponds to the entire wake up phrase. If it is determined that the phonetic string /HH AHO L OW1/ is present, this information is used in formation of a hypothesis of underlying speech 445, as represented by an arc 405. Specifically, the wake up phrase is excluded from the hypothesis of underlying speech 445. Alternatively, the wake up phrase may still be included in the hypothesis of underlying speech 445, but ignored during interpretation of the command that is also within the speech signal. In all scenarios depicted in FIG. 4, the language model 330 is also used to form the hypothesis of underlying speech 445 using WFST recognition techniques as known in the art.

An arc 410 represents comparison of the received speech signal 402 to the phonetic string /AHO L OW1/, which is a pseudo-word corresponding to a first portion of the wake up phrase. If it is determined that the phonetic string /AHO L OW1/ is present, this information is used in formation of the hypothesis of underlying speech 445, as represented by an arc 415. An arc 420 represents comparison of the received speech signal 402 to the phonetic string /L OW1/, which is a pseudo-word corresponding to a second (smaller) portion of the wake up phrase. If it is determined that the phonetic string /L OW1/ is present, this information is used in formation of a hypothesis of the underlying speech 445, as represented by an arc 425. An arc 430 represents comparison of the received speech signal 402 to the phonetic string /OW1/, which is a pseudo-word corresponding to a third (smaller) portion of the wake up phrase. If it is determined that the phonetic string /OW1/ is present, this information is used in formation of the hypothesis of the underlying speech 445, as represented by an arc 435. If none of the phonetic strings in the filler model 325 are detected in the speech signal, this information is also used in formation of the hypothesis of underlying speech 445, as represented by an arc 440.

Referring again to FIG. 3, once a hypothesis of underlying speech is generated, the hypothesis is further processed by the main ASR processing system 205. Specifically, the main ASR processing system 205 uses the decoder 340, which can be implemented in hardware and/or software, to identify a command included in the hypothesis. Once the command is identified, the processor 335 instructs the ASR application 210 to perform the command. The ASR application 210 can be any type of speech controlled application or program known in the art. For example, the ASR application 210 can be a home automation system that controls lights, heating, cooling, entertainment devices, etc. in a home. The ASR application 210 can also be part of an automobile computer system, a smart phone application, a search engine, a home security system, a remote entry system, a music player, etc.

As an example, an original speech signal uttered by a user can be "Hello, play song X," where "Hello" is a wake up phrase and "X" refers to a song title. In this example, the ASR application 210 is a music player which may be part of a smart phone, a dedicated portable music player, a program on a laptop/desktop computer, a home entertainment center, etc. Upon detection of the wake up phrase, the standby processing system 200 activates the remainder of the ASR system and passes at least a portion of the original speech signal to the main ASR processing system 205. The main ASR processing system 205 uses the filler model 325 and the language model 330 to generate a hypothesis of the underlying speech in the received speech signal. If any portion of the wake up phrase is present, use of the filler model 325 helps ensure that the wake up phrase (or portion thereof) is excluded from the hypothesis or ignored during further processing of the hypothesis by the main ASR processing system 205. The main ASR processing system 205 identifies a command based on the hypothesis, and instructs the ASR application 210 (i.e., the music player) to play the song "X."

The ASR system described with reference to FIGS. 2 and 3 can be a local system or a distributed system in which one or more system components are remotely located. For example, the entire ASR system may be incorporated into a single device such as smart phone, computer, tablet, etc. Alternatively, one or more portions of the ASR system (e.g., the standby processing system 200) can be located at a first location such as a user's home or automobile, and one or more other portions of the ASR system may be remotely located at a processing facility. In such an implementation, the portions of the ASR system that are local to the user are lower power components with limited processing capability, and the remote portions of the ASR system have greater processing capability and may consume more power. In such a distributed implementation, the ASR system components can communicate with one another through wired or wireless networks as known in the art.

An experiment was conducted to test the use of a filler model in an ASR system, as described herein. The recognition experiment analyzed Mandarin Chinese speech in which the speech recordings contain at least a partial wake up phrase. The experiment compared sentence error rates for three different scenarios: i) a complete signal scenario in which the entire wake up phrase and command are provided to the main ASR processing system, ii) a partial signal scenario in which offline computing was used to attempt to make an exact cut between the wake up phrase and the command so that only the command is provided to the main ASR processing system, and iii) a partial signal scenario in which offline processing was used to attempt to cut the speech signal 0.6 seconds prior to the command. The first scenario is an ideal scenario that is not always practical due to system limitations as discussed herein. The second scenario is used for comparison purposes, but is not practical in real world applications due to the difficulty in determining the exact cutoff between the wake up phrase and the command. The third scenario is a realistic representation of the speech signals that would actually be received by the main ASR processing system. Each of these three scenarios was tested with and without the use of a filler model.

As expected, the first scenario in the experiment provides the lowest error rates, namely a 2.4% error rate without the use of a filler model and a 2.5% error rate with the use of a filler model. As noted above, this scenario is impractical in many real world applications. The second scenario had slightly higher error rates, which demonstrates the high level of difficulty involved with trying to determine the 'exact' cut between the wake up phrase and the command, even with the use of offline processing to make the determination. In the second scenario, the error rate was 2.7% without the use of a filler model and 2.8% with the use of the filler model. The third scenario, which is the most realistic scenario for real world applications, had an error rate of 4.6% without the use of a filler model and an error rate of 2.6% with the use of a filler model. This result demonstrates a significant improvement in system accuracy with the introduction of a filler model at the front end of a main ASR processing system.

Figure 5:
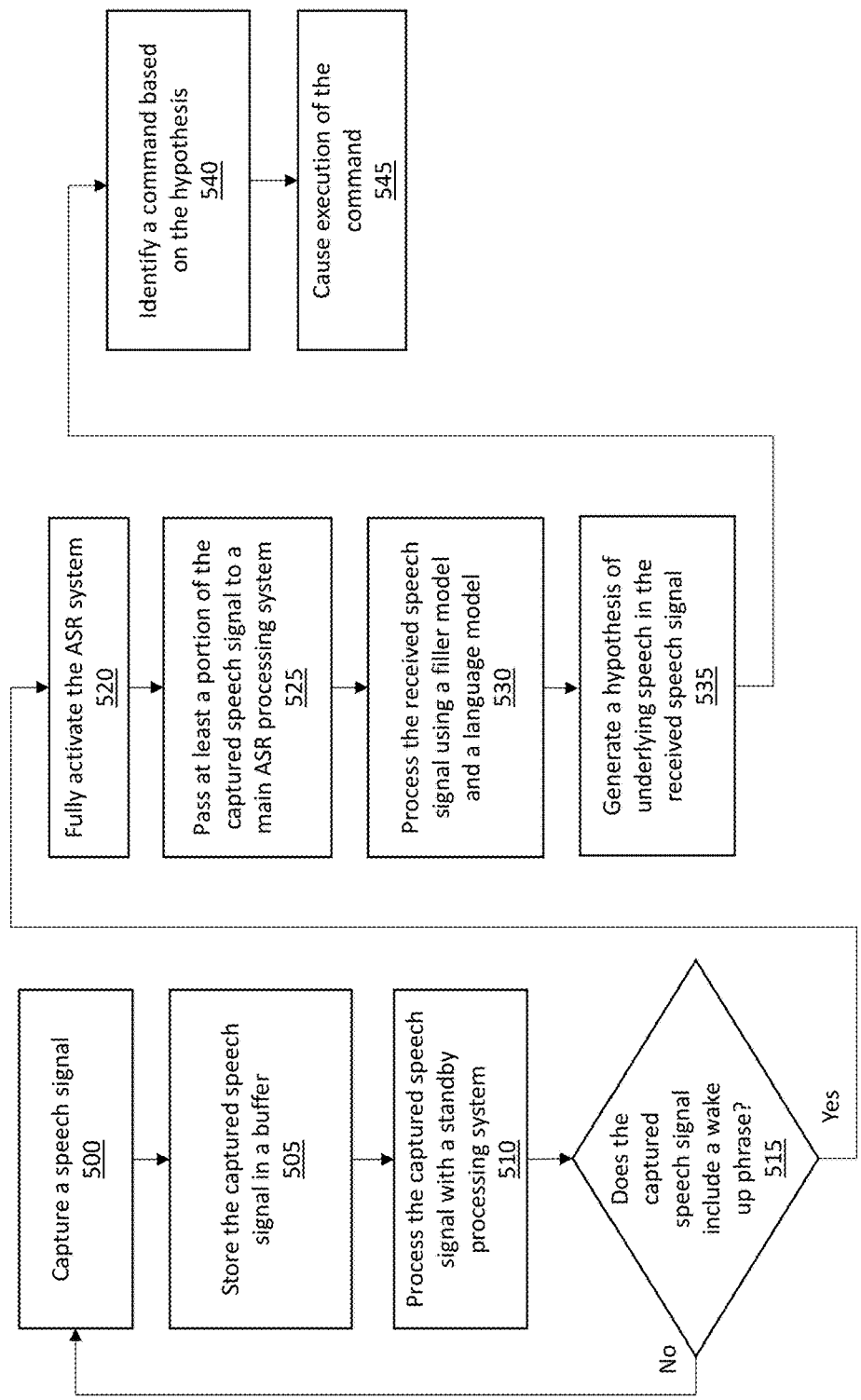
FIG. 5 is a flow diagram depicting operations performed by an ASR system in accordance with an illustrative embodiment.

FIG. 5 is a flow diagram depicting operations performed by an ASR system in accordance with an illustrative embodiment. In alternative embodiments, fewer, additional, and/or different operations may be performed. Also, the use of a flow diagram is not meant to be limiting with respect to the order of operations performed. A speech signal is captured in an operation 500. The speech signal is captured with one or more microphones that are part of a standby processing system of an ASR system. Any type(s) of microphone may be used. The captured speech signal is stored in a buffer in an operation 505. The buffer, which is also part of the standby processing system, can be a ring buffer, a circle buffer, or any other type of buffer, memory, or storage device.

In an operation 510, the captured speech signal is processed by a wake up phrase processor of the standby processing system. As discussed above, the wake up phrase processor can be composed of hardware and/or software. The wake up phrase processor processes the captured speech signal in an effort to identify a wake up phrase therein. A wake up phrase model includes a phonetic representation of the wake up phrase and is used by the wake up phrase processor to perform the analysis.

In an operation 515, a determination is made regarding whether the captured speech signal includes the wake up phrase. The determination is performed by the wake up phrase processor and is based on the processing performed in the operation 510. If it is determined that the captured speech signal does not include the wake up phrase, the process returns to the operations 500-510 in which a subsequent speech signal is captured, stored in the buffer, and processed. In one embodiment, the initially captured speech signal is deleted from the buffer (e.g., overwritten) when the subsequent speech signal is captured. Alternatively, the buffer may be configured to store multiple different speech signals captured at different times.

If it is determined that the captured speech signal includes the wake up phrase, the ASR system is fully activated in an operation 520. As discussed herein, the standby processing system may operate in a lower power mode to conserve resources, and a remainder of the ASR system is in a sleep (or other low power) state until needed to perform speech recognition. Activation of the ASR system can occur responsive to an instruction sent from the standby processing system. In an operation 525, at least a portion of the captured speech signal is passed on to a main ASR processing system. If the standby processing system and the main ASR processing system are both housed locally, the speech signal can be passed via a system bus or other internal communication medium. If the standby processing system and the main ASR processing system are remotely positioned relative to one another, the speech signal is passed via a wired or wireless connection either directly or through a network.

Due to possible limitations in buffer space, bandwidth, power consumption, etc. associated with the standby processing system, it is not always feasible to pass along the entire captured speech signal. As a result, in some systems, only a portion of the initially captured speech signal is passed to the main ASR processing system. Additionally, due to possible co-articulation that occurs when the user utters speech without pause, it is not always possible for the standby processing system to determine a clean break between a wake up phrase portion of the captured speech signal and a command portion of the captured speech signal. Therefore, the speech signal that is passed along may include a portion of the wake up phrase (or the entire wake up phrase), which can result in processing errors and/or execution of an unintended command.

In an operation 530, the main ASR processing system processes the received speech signal using a filler model and a standard language model. In alternative embodiments, additional models may also be used. Specifically, the main ASR processing system uses the filler model to determine whether the received speech signal includes any portion of the wake up phrase. The standard language model is used in conjunction with the filler model to recognize the underlying speech in the received speech signal. As discussed above, the filler model includes phonetic strings corresponding to the entire wake up phrase and each ordered combination of phonemes that form portions of the wake up phrase. For example, if the wake up phrase includes X phonemes, a first phonetic string in the filler model includes the X phonemes (in the order in which the wake up phrase is normally spoken), a second phonetic string in the filler model includes X−1 phonemes where the removed phoneme is the first phoneme in the first phonetic string, a third phonetic string in the filler model includes X−2 phonemes where the removed phonemes are the first two phonemes in the first phonetic string, and so on until the last phonetic string has a single phoneme which is the last phoneme in the first phonetic string.

In an operation 535, the system generates a hypothesis of underlying speech included in the received speech signal based on the processing performed in the operation 530. In an illustrative embodiment, the hypothesis of underlying speech excludes any portion of the wake up phrase that is determined to be in the received speech signal during the processing of operation 530. In an alternative embodiment, the hypothesis of underlying speech can include the wake up phrase (or portion thereof) and the system can ignore the wake up phrase (or portion thereof) during subsequent processing.

In an operation 540, the main ASR processing system identifies a command based on the hypothesis of underlying speech. The command can be identified using a decoder and/or natural language processing techniques as known in the art. In an operation 545, the main ASR processing system causes execution of the command. As discussed, execution of the command involves sending an instruction to an ASR application that is able to perform the command.

Figure 6:
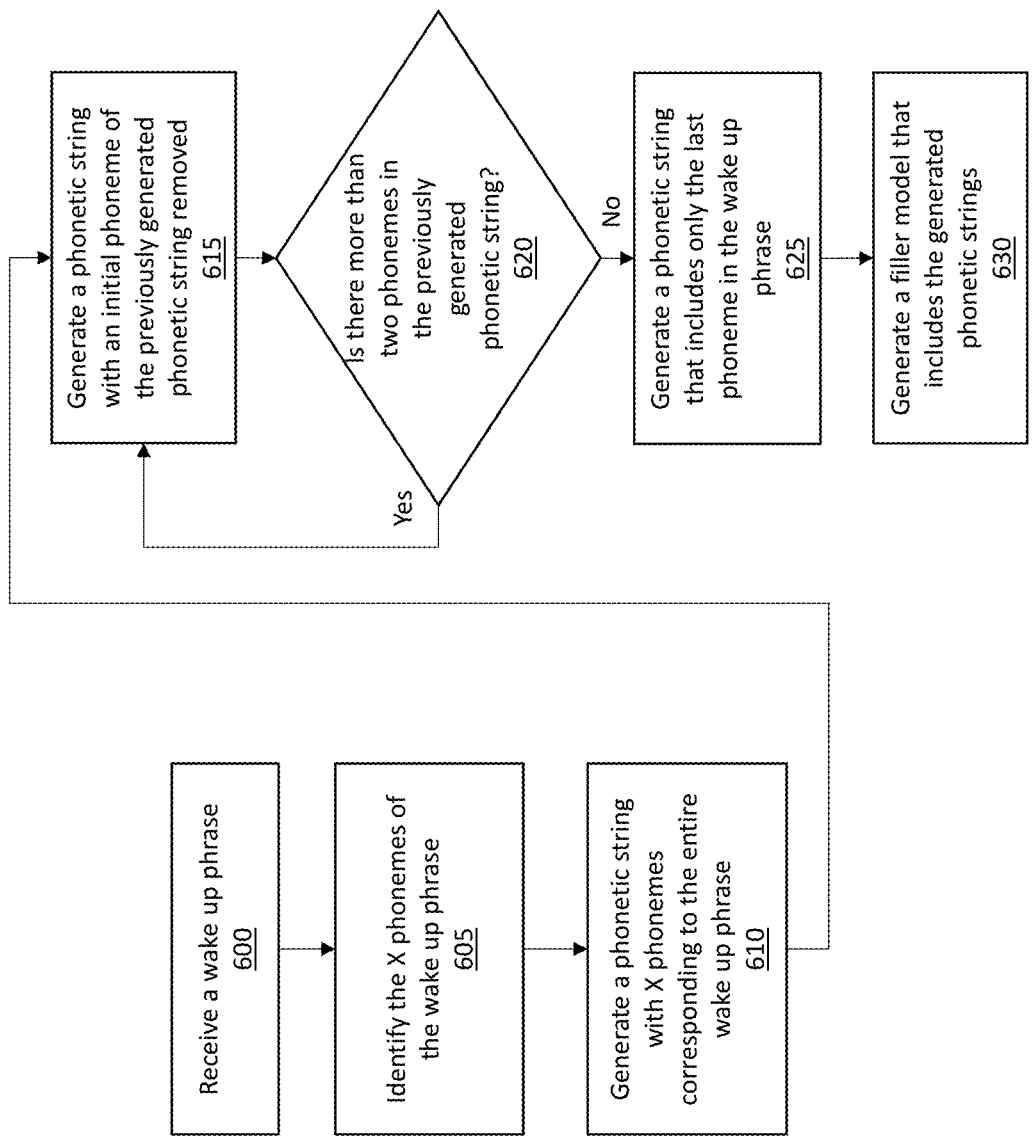
FIG. 6 is a flow diagram depicting operations performed by an ASR system to automatically generate a filler model in accordance with an illustrative embodiment.

FIG. 6 is a flow diagram depicting operations performed by an ASR system to automatically generate a filler model in accordance with an illustrative embodiment. In alternative embodiments, fewer, additional, and/or different operations may be performed. Additionally, the use of a flow diagram is not meant to be limiting with respect to the order of operations performed. In an alternative embodiment, the filler model may not be automatically generated. In such an embodiment, the filler model can be manually input into the ASR system by a system administrator or system user.

In an operation 600, a wake up phrase is received by an ASR system. The wake up phrase can be received from a user/owner of the ASR system. For example, the ASR system may have a default wake up phrase (e.g., Hello), but may also allow the user to change the default wake up phrase to one of his/her choosing such as "Hey Bob" or "Wake Up." The wake up phrase can be received via a spoken instruction from the user, via a user interface of the ASR system or a computer that includes the ASR system, via an application used to access the ASR system, via a website in communication with the ASR system, etc.

In an operation 605, the (X) phonemes of the wake up phrase are identified, where X refers to the total number of phonemes included in the wake up phrase. The value of X is one or greater. The X phonemes are identified using a lexicon or database in which phonetic versions of words are stored. For example, if the received wake up phrase is "Hey Bob," the ASR system searches the lexicon for the terms "Hey" and "Bob" and identifies the phonemes corresponding to each word to identify the X phonemes. In an alternative implementation, the ASR system may be configured to automatically determine the phonetic versions of words without the use of a lexicon or database.

In an operation 610, the ASR system generates a phonetic string with the X phonemes corresponding to the entire wake up phrase. The phonetic string generated in the operation 610 is an ordered string of the X phonemes indicative of the order in which the term(s) of the wake up phrase are normally spoken. In an operation 615, the ASR system generates a phonetic string with an initial phoneme of the previously generated phonetic string removed. In this case, the previously generated phoneme string included X phonemes and corresponded to the entire wake up phrase. As such, the phonetic string initially generated in the operation 615 includes X−1 phonemes and corresponds to the phonetic string generated in the operation 610, with the exception that the first phoneme has been removed. For example, if the first phonetic string generated in the operation 610 is /A B C D E/ (i.e., X=5), the second phonetic string generated in the operation 615 is /B C D E/.

In an operation 620, the ASR system determines whether there are more than two phonemes in the previously generated phonetic string. Continuing the example from above, the previously generated (i.e., second) phonetic string includes 4 phonemes. A result of the determination in the operation 620 is therefore 'Yes,' and the process returns to the operation 615 to generate another (third) phonetic string with an initial phoneme of the previously generated (second) phonetic string removed. Continuing the example, the previously generated (second) phonetic string includes 4 phonemes, and the third phonetic string generated in the operation 615 therefore includes 3 phonemes and is /C D E/. It follows that the fourth phonetic string generated in the operation 615 includes 2 phonemes and is /D E/.

In this example, the fourth phonetic string includes 2 phonemes, and the determination of whether there are more than 2 phonemes in the previously generated phonetic string is therefore 'No' after generation of the fourth phonetic string. As a result, the process proceeds to an operation 625 in which the ASR system generates a phonetic string that includes only the last phoneme in the wake up phrase. The fifth phonetic string generated in the operation 625 is therefore /E/, and includes only the last phoneme from the first phonetic string generated in the operation 610.

In an operation 630, the ASR system generates a filler model that includes the generated phonetic strings. In the example above, the filler model includes five phonetic strings as follows: /A B C D E/, /B C D E/, /C D E/, /D E/, and /E/. In an illustrative embodiment, the filler model is configured as a weighted finite state transducer. Alternatively, the filler model can be implemented as a simple data set stored in memory. As described herein, the filler model is used to identify any portion of the wake up phrase in a received speech signal such that the portion of the wake up phrase can be removed prior to processing the speech signal.

Figure 7:
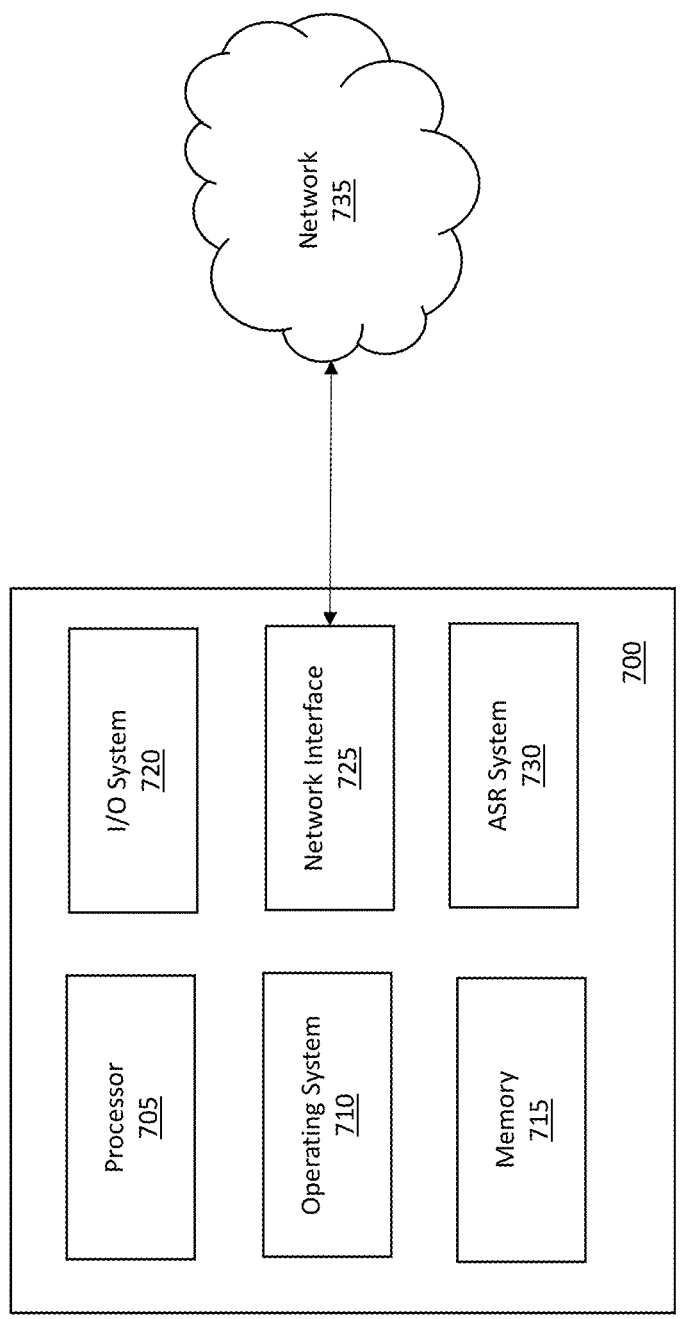
FIG. 7 is a block diagram of a computing system that includes an ASR system in accordance with an illustrative embodiment.

FIG. 7 is a block diagram of a computing system 700 that includes an ASR system in accordance with an illustrative embodiment. The computing system 700 includes a processor 705, an operating system 710, a memory 715, an input/output (I/O) system 720, a network interface 725, and an ASR system 730. In alternative embodiments, the computing system 700 may include fewer, additional, and /or different components. The components of the computing system communicate with one another via one or more buses or any other interconnect system. The computing system 700 can be incorporated into a device such as a laptop computer, desktop computer, smart phone, tablet, gaming device, workstation, server, imaging device, an automobile computer system, a music player device, a navigation device, etc.

The processor 705 can be any type of computer processor known in the art, and can include a plurality of processors and /or a plurality of processing cores. The processor 705 can include a controller, a microcontroller, an audio processor, a graphics processing unit, a hardware accelerator, a digital signal processor, etc. Additionally, the processor 705 may be implemented as a complex instruction set computer processor, a reduced instruction set computer processor, an x86 instruction set computer processor, etc. The processor is used to run the operating system 710, which can be any type of operating system.

The operating system 710 is stored in the memory 715, which is also used to store programs, user data, network and communications data, peripheral component data, and other operating instructions. The memory 715 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 720 is the framework which enables users and peripheral devices to interact with the computing system 700. The I/O system 720 can include a mouse, a keyboard, one or more displays, a speaker, a microphone, etc. that allow the user to interact with and control the computing system 700. The I/O system 720 also includes circuitry and a bus structure to interface with peripheral computing devices such as power sources, USB devices, peripheral component interconnect express (PCIe) devices, serial advanced technology attachment (SATA) devices, high definition multimedia interface (HDMI) devices, proprietary connection devices, etc.

The network interface 725 includes transceiver circuitry that allows the computing system to transmit and receive data to/from other devices such as remote computing systems, servers, websites, etc. The network interface 725 enables communication through a network 735, which can be one or more communication networks. The network 735 can include a cable network, a fiber network, a cellular network, a wi-fi network, a landline telephone network, a microwave network, a satellite network, etc. The network interface 725 also includes circuitry to allow device-to-device communication such as Bluetooth® communication.

The ASR system 730 can include any of the various ASR components described herein such as an audio capture device, a buffer, a wake up phrase processor, a wake up phrase model, a filler model, a speech recognition processor, a natural language decoder, a language model, etc. The ASR system 730 can utilize the processor 705 and /or the memory 715. Alternatively, the ASR system 730 may include its own processor(s) and /or memory system(s). The ASR system 730 can also include an ASR application that is controlled by voice. Alternatively, the ASR application can be remote or independent from the ASR system 730, but in communication therewith.

EXAMPLES

Embodiments disclosed herein can be implemented as hardware, software, firmware, and /or special purpose processing devices. As an example, a non-transitory computer-readable storage medium has instructions stored thereon that, when executed by one or more processors, cause operations described herein to be performed, such as capturing a speech signal, performing standby processing of the speech signal, performing processing of the speech signal using a filler model and a language model, generating a hypothesis of the underlying speech in the speech signal, identifying a command within the speech signal based on the hypothesis, etc. The instructions can be encoded using a programming language such as C, C++, Java, JavaScript, Visual Basic, proprietary languages, etc. The instructions are provided in the form of software applications tangibly embodied on storage medium.

The non-transitory computer-readable medium can be any type of medium able to store digital information, such as a hard drive, a server, a flash memory, random access memory (RAM), a combination of memories, etc. In some embodiments, the components described herein can be implemented using hardware such as field-programmable gate arrays (FPGAs), application-specific integrated circuits (ASICs), etc. It should be apparent that any suitable combination of hardware, software, and firmware can be used to implement the described embodiments, and that the described embodiments are not limited to any particular architecture.

As one example, an ASR system includes a memory and one or more processors operatively coupled to the memory. The ASR system includes at least a standby processing system and a main ASR processing system that includes a filler model. Each of these three sub-systems can include its own memory and processor(s). Alternatively, the memory and processor(s) can be shared among the sub-systems. The sub-systems can be local to a device or distributed among devices.

The memory is configured to store a filler model of the system. The filler model includes one or more phonetic strings corresponding to one or more portions of a wake up phrase. The one or more processors are configured to analyze a speech signal with the filler model and a language model to determine whether the speech signal includes the wake up phrase or any portion of the wake up phrase. Specifically, the one or more processors identify one or more phonemes in the speech signal and compare the one or more identified phonemes in the speech signal to the one or more phonetic strings in the filler model to determine whether the speech signal includes the wake up phrase or any portion of the wake up phrase.

Based on the analysis, the one or more processors generate a hypothesis of underlying speech included in the speech signal, where the hypothesis excludes or ignores the wake up phrase or any portion of the wake up phrase included in the speech signal. The one or more processors also recognize a command in the hypothesis and cause execution of the command by an ASR application.

The standby processing system of the ASR system includes an audio capture device and a buffer. The audio capture device, which can be a microphone, is used to capture an initial speech signal uttered by a user of the ASR system. The initial speech signal is stored in the buffer. The standby processing system analyzes the initial speech signal to determine if the wake up phrase is present in the initial speech signal. Responsive to a determination that the wake up phrase is present in the initial speech signal, the standby processing system activates the main automatic speech recognition processing system. Also responsive to the determination that the wake up phrase is present in the initial speech signal, the standby processing system passes at least a portion of the speech signal to the main ASR processing system.

In one example implementation, the system is configured to automatically generate the filler model. In such an embodiment, the system automatically identifies one or more phonemes that are included in the wake up phrase, and forms the one or more phonetic strings using the one or more phonemes. The system automatically generates the filler model with the one or more phonetic strings. The filler model can be generated as a weighted finite state transducer (WFST). The WFST can have either a dynamic vocabulary or a static vocabulary.

Another example embodiment is a method of performing automatic speech recognition with an ASR system that includes one or more processors and a memory. The ASR system includes at least a standby processing system and a main ASR processing system. A filler model may be incorporated into a front end of the main ASR processing system. Alternatively, the filler model can be incorporated into a filler model processing system which is a sub-system of the overall ASR system. The method includes analyzing, by the one or more processors, a speech signal with a filler model and a language model to determine whether the speech signal includes a wake up phrase or any portion of the wake up phrase. The filler model includes one or more phonetic strings corresponding to one or more portions of the wake up phrase. Analyzing the speech signal includes identifying one or more phonemes in the speech signal and comparing the one or more identified phonemes in the speech signal to the one or more phonetic strings in the filler model to determine whether the speech signal includes the wake up phrase or any portion of the wake up phrase.

The method also includes generating, based on the analysis, a hypothesis of underlying speech included in the speech signal, where the hypothesis excludes or ignores the wake up phrase or any portion of the wake up phrase included in the speech signal. The method also includes recognizing a command in the hypothesis and causing execution of the command by an ASR application. The method further includes capturing, by an audio capture device of the standby processing system, an initial speech signal, which is stored in a buffer of the standby processing system.

The method also includes generating the filler model. Specifically, the method includes identifying, by the one or more processors, one or more phonemes that are included in the wake up phrase. The method includes forming, by the one or more processors, the one or more phonetic strings using the one or more phonemes, and generating the filler model with the one or more phonetic strings. In one implementation, the filler model is generated as a weighted finite state transducer (WFST).

Another example is a non-transitory computer-readable storage medium having computer-readable instructions stored thereon. Execution of the computer-readable instructions by one or more processors in an automatic speech recognition system results in operations including analyzing a speech signal with a filler model and a language model to determine whether the speech signal includes a wake up phrase or any portion of the wake up phrase, where the filler model includes one or more phonetic strings corresponding to one or more portions of the wake up phrase. Based on the analysis, a hypothesis of underlying speech included in the speech signal is generated, where the hypothesis excludes or ignores the wake up phrase or any portion of the wake up phrase included in the speech signal. The operations also include recognizing a command in the hypothesis and causing execution of the command by an ASR application.

The computer-readable instructions also result in operations for generating the filler model, including identifying one or more phonemes that are included in the wake up phrase, forming the one or more phonetic strings using the one or more phonemes, and generating the filler model with the one or more phonetic strings. The filler model is generated as a weighted finite state transducer (WFST) in at least one implementation.

The computer-readable instructions also result in operations including identifying one or more phonemes in the speech signal and comparing the one or more identified phonemes in the speech signal to the one or more phonetic strings in the filler model to determine whether the speech signal includes the wake up phrase or any portion of the wake up phrase.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An automatic speech recognition system comprising:
a standby processing system configured to identify a wake up phrase in an initial speech signal;
a main automatic speech recognition (ASR) processing system coupled to the standby processing system and configured to receive a speech signal from the standby processing system, wherein the speech signal comprises at least a portion of the initial speech signal and includes at least a portion of the wake up phrase, wherein the main ASR processing system includes a filler model that includes a plurality of phonetic strings corresponding to a plurality of portions of the wake up phrase, and wherein the main ASR system includes one or more processors configured to:
analyze, with the filler model, a portion of the speech signal to identify the portion of the wake up phrase that is present in the speech signal, wherein to perform the analyzing, the one or more processors are configured to identify one or more phonemes in the speech signal and compare the one or more identified phonemes in the speech signal to the phonetic strings in the filler model to identify the portion of the wake up phrase; and
generate, based on the analysis, a hypothesis of underlying speech included in the speech signal, wherein the hypothesis excludes the portion of the wake up phrase included in the speech signal.

2. The automatic speech recognition system of claim 1, comprising a microphone to capture the initial speech signal.

3. The automatic speech recognition system of claim 2, wherein the standby processing system is configured to:
store the initial speech signal in a buffer;
analyze the initial speech signal to determine if the wake up phrase is present in the initial speech signal; and
responsive to a determination that the wake up phrase is present in the initial speech signal, activate the main automatic speech recognition processing system.

4. The automatic speech recognition system of claim 3, wherein the speech signal comprises all of the initial speech signal.

5. The automatic speech recognition system of claim 1, wherein the one or more processors are configured to automatically generate the filler model based on the wake up phrase.

6. The automatic speech recognition system of claim 1, wherein the hypothesis includes a command, and wherein the one or more processors are configured to cause execution of the command by an automatic speech recognition application.

7. The automatic speech recognition system of claim 1, wherein the filler model is implemented as a weighted finite state transducer (WFST).

8. The automatic speech recognition system of claim 7, wherein the WFST has a dynamic vocabulary.

* * * * *